US012247538B2

(12) United States Patent
Benham et al.

(10) Patent No.: US 12,247,538 B2
(45) Date of Patent: Mar. 11, 2025

(54) ADAPTABLE BARRELS FOR FUEL INJECTION

(71) Applicant: Cummins Inc., Columbus, IN (US)

(72) Inventors: Eric A. Benham, Columbus, IN (US); Karthik Sethuraman, Columbus, IN (US); Richard E. Duncan, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/310,181

(22) Filed: May 1, 2023

(65) Prior Publication Data

US 2023/0265817 A1 Aug. 24, 2023

Related U.S. Application Data

(63) Continuation of application No. PCT/US2020/059314, filed on Nov. 6, 2020.

(51) Int. Cl.

| | |
|---|---|
| ***F02M 55/00*** | (2006.01) |
| ***F02M 55/02*** | (2006.01) |
| ***F02M 59/46*** | (2006.01) |
| *F04B 7/00* | (2006.01) |

(52) U.S. Cl.

CPC ........ *F02M 55/005* (2013.01); *F02M 55/025* (2013.01); *F02M 59/466* (2013.01); *F04B 7/0076* (2013.01)

(58) Field of Classification Search

CPC .. F02M 55/005; F02M 55/025; F02M 59/466; F04B 7/0076; F04B 53/1022

See application file for complete search history.

(56) References Cited

U.S. PATENT DOCUMENTS

| | | | | |
|---|---|---|---|---|
| 4,480,623 | A * | 11/1984 | Thomas | F02M 59/442 123/41.31 |
| 5,353,766 | A | 10/1994 | Peters et al. | |
| 6,363,917 | B1 | 4/2002 | Hopley | |
| 7,156,625 | B2 | 1/2007 | Grant | |
| 7,207,786 | B2 | 4/2007 | Grant | |
| 10,041,447 | B2 * | 8/2018 | Bean | F02M 21/0218 |
| 2003/0019478 | A1 * | 1/2003 | Gibson | F02M 59/06 123/456 |
| 2009/0159053 | A1 * | 6/2009 | Stockner | F04B 53/16 123/495 |
| 2011/0052427 | A1 | 3/2011 | Shaull et al. | |
| 2018/0171949 | A1 | 6/2018 | Shaull et al. | |

OTHER PUBLICATIONS

"International Search Report and Written Opinion", PCT Appln. No. PCT/US20/59314, Feb. 8, 2021, 8 pgs.

* cited by examiner

*Primary Examiner* — Syed O Hasan

(74) *Attorney, Agent, or Firm* — Taft, Stettinius & Hollister LLP

(57) ABSTRACT

High-pressure fuel pumps and systems incorporating the same are disclosed. The fuel pump includes a housing with at least one fluid feed port, a barrel with at least one fluid receiving port, and a clamp to secure the barrel to the housing. The barrel has a first surface configured to contact a second surface of the housing to form a groove. The groove provides fluid communication between the at least one fluid feed port of the housing and the at least one fluid receiving port of the barrel.

14 Claims, 2 Drawing Sheets

100

100

108

102

ADAPTABLE BARRELS FOR FUEL INJECTION

RELATED APPLICATION

This application is a continuation of International PCT Application No. PCT/US2020/059314 filed on Nov. 6, 2020, the disclosure of which is incorporated herein by reference.

FIELD OF THE DISCLOSURE

The present disclosure relates generally to fuel pumps, especially to the fuel pumps that are connected to a fuel-powered engine.

BACKGROUND OF THE DISCLOSURE

High-pressure fuel pumps can be mounted in different orientations depending on the configuration of the engine to which it is mounted. These orientations can sometimes drive the need for the barrel outlet line connections to be placed such that certain engine components are cleared. Conventional barrels as known in the art have predetermined mounting bolt locations which are determined based on where location of the barrel outlet(s) is fixed. So in the event that the location of the barrel outlet prevents the bolt location to be mounted, a different barrel must be used instead that does not include the barrel outlet intervening with the bolt placement. Additionally, during manufacture, care must be taken to ensure that the components such as the conventional barrels and the rest of the engine and fuel delivery system, e.g. the rail line components and engine housing, are in precise alignment with each other to enable optimal fluid connection, since the conventional barrels are specially designed to accommodate certain types of engine housing configurations. As such, there are advantages to designing barrels that have better flexibility to accommodate different types of engines.

SUMMARY

Various embodiments of the present disclosure relate to high-pressure fuel pumps. The fuel pump includes a housing with at least one fluid feed port, a barrel with at least one fluid receiving port, and a clamp to secure the barrel to the housing. The barrel has a first surface configured to contact a second surface of the housing to form a groove. The groove provides fluid communication between the at least one fluid feed port of the housing and the at least one fluid receiving port of the barrel.

In some examples, the barrel is secured to the housing in any of a plurality of positions, and the groove provides fluid communication between the at least one fluid feed port and the at least one fluid receiving port in each of the plurality of positions. In some examples, the fuel pump also includes an outlet from which fluid in the fuel pump. A position of the outlet is adjustable with respect to the housing.

In some examples, the first surface of the barrel is a smooth surface and the second surface of the housing has an indentation which defines the groove. Alternatively, in some examples, the second surface of the housing is a smooth surface and the first surface of the barrel has an indentation which defines the groove. In yet other examples, the first surface of the barrel and the second surface of the housing each has an indentation which together define the groove.

In some examples, the groove includes an inner groove and an outer groove. In some examples, the inner groove extends farther away from the second surface of the housing than the outer groove. In some examples, the at least one fluid feed port is located along the inner groove.

In some examples, the groove has a circular configuration. In some examples, the groove provides fluid communication between the at least one fluid feed port and the at least one fluid receiving port when the at least one fluid feed port and the at least one fluid receiving port are unaligned with respect to each other. In some examples, the groove is positioned around an opening of the housing in which a portion of the barrel is inserted when the first and second surface make contact.

Various embodiments of the present disclosure relate to common rail fuel injection systems. The system includes a housing with a plurality of fluid feed ports configured to deliver fuel, a plurality of barrels, and a plurality of clamps to secure the barrels to the housing. Each barrel has a plurality of fluid receiving ports. The barrels have a plurality of first surfaces that contact a second surface of the housing to form a plurality of groove in any of a plurality of positions. Each of the grooves provides fluid communication between at least one of the fluid feed ports of the housing and at least one of the fluid receiving ports of the barrels in each of the positions.

In some examples, each of the first surfaces is a smooth surface and the second surface of the housing having a plurality of indentations which define the grooves. Alternatively, in some examples, the second surface of the housing is a smooth surface, and each of the first surfaces of the barrels has an indentation which defines one of the grooves. In yet other examples, the first surface of the barrel and the second surface of the housing each has an indentation which together define the groove.

Various embodiments of the present disclosure relate to methods of assembling a high-pressure fuel injection system. The method includes preparing a housing which includes a plurality of fluid feed ports configured to deliver fuel, preparing a plurality of barrels, each including a plurality of fluid receiving ports, contacting first surfaces of the barrels with a second surface of the housing to form a plurality of grooves between the first and second surfaces in any of a plurality of positions, and securing the barrels to the housing using a plurality of clamps. Each of the grooves provides fluid communication between at least one of the fluid feed ports of the housing and at least one of the fluid receiving ports of the barrels in each of the positions.

In some examples, securing the barrels includes, for each of the barrel, drilling at least one bolt through the clamp and the barrel such that an end of the at least one bolt is positioned in the housing. In some examples, the method also includes rotating at least one of the barrels with respect to the housing while maintain the fluid communication between the at least one of the fluid feed ports and the at least one of the fluid receiving ports.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the disclosure itself will be better understood by reference to the following description of embodiments taken in conjunction with the accompanying drawings, wherein.

Figure 2:
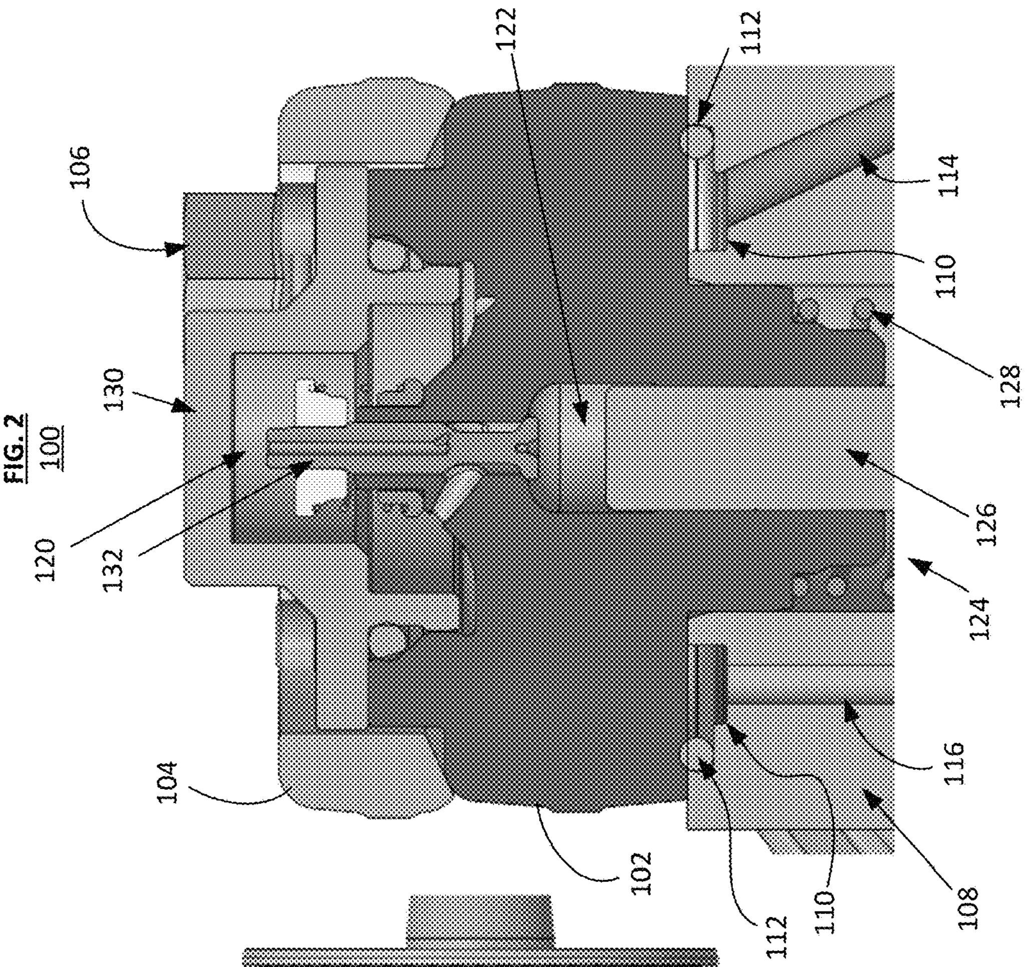
FIG. 2 is a cutaway sideview of the engine of FIG. 1.

Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1:
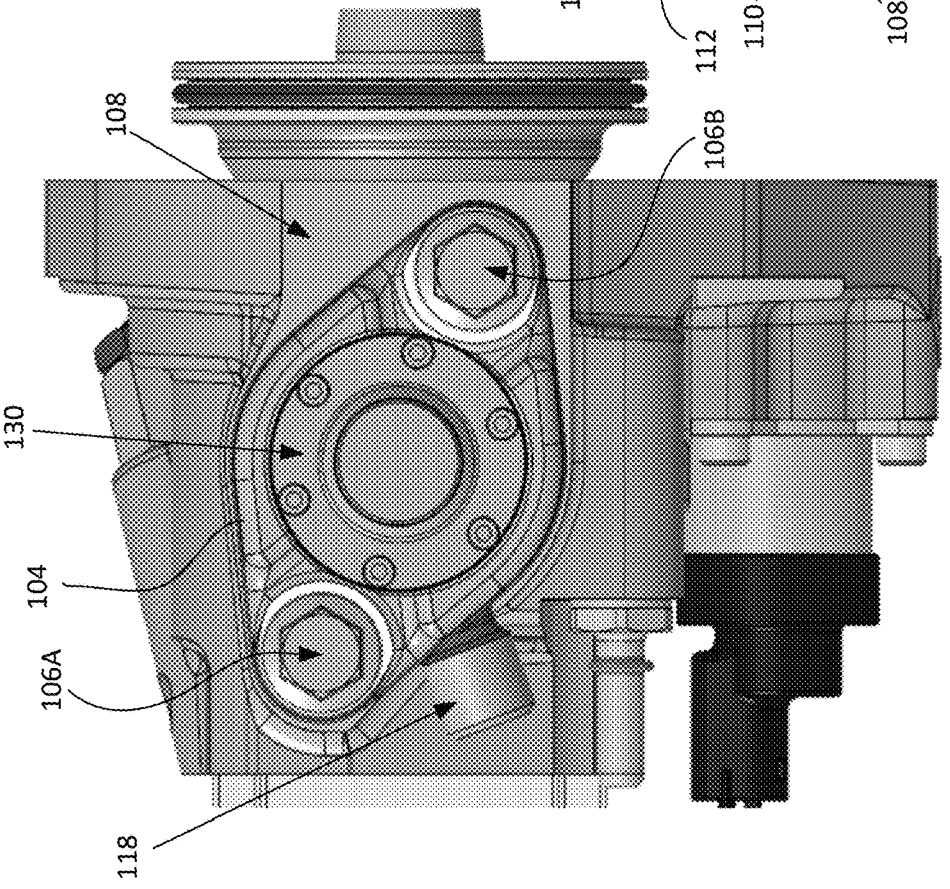
FIG. 1 is a top view of an engine incorporating a flexible barrel as disclosed herein.

FIGS. 1 and 2 show an embodiment of a high-pressure fuel pump 100 with a flexibly adaptable barrel 102 as implemented as part of the fuel injection components of an engine, for example a high-pressure common rail fuel system. FIG. 1 shows the top view and FIG. 2 shows a cutaway view of the high-pressure pump 100 from the side. The barrel 102 may be mounted in an angular orientation when viewed from above with respect to the orientation of a housing 108 of the engine to provide a specified position for an outlet 118 which may be used to relieve some of the pressure within the pump 100. In different types of high-pressure pumps 100, the location of the outlet 118 may vary and some may have the outlet 118 located at a different location of the barrel 102 from the one that is shown. High-pressure pumps are capable of handling 2200 bar or greater in system pressure for efficient combustion.

Surfaces of the barrel 102 and the housing 108 come into contact with each other to form a groove 110 in between, which is sealed via a mechanical gasket 112. The gasket 112 in some examples may be an O-ring in the shape of a torus. The groove 110 is a fluid passageway which is fluidly coupled with a feed drilling (i.e. in a fluid connection or fluid communication of any suitable size) forming a fluid feed port 114, positioned independently of the location or position of the outlet 118. The fluid feed port 114 can be angularly located in the housing 108 with respect to the orientation of the housing 108, and in some examples there may be one or more additional auxiliary fluid feed port 116 extending from the groove 110. The auxiliary feed port(s) 116 is also fluidly coupled with the groove 110.

The groove 110 extends around a housing chamber 124 along the contact portion of the barrel 102 and the housing 108 in any suitable configuration. The chamber 124 is a portion of the housing 108 into which the barrel 102 is inserted. For plunger-type pumps, a spring 128 placed inside the chamber 124 around a plunger 126 such that the plunger 126 is pulled outward creating a lower pressure to pull fuel into a pumping chamber 122, which is defined by the barrel 102. For example, the fuel may be inserted from the fluid feed port 114.

In some examples, the groove 110 may have a circular shape which extends 360-degrees around the chamber 124. During an injection event, the fuel flows from the housing 108 through the fluid feed port 114 and into the pumping chamber 122. Fuel passes from the pumping chamber 122 and exits the barrel 102 through the outlet 118. The plunger 126 may be driven by a camshaft, either directly or via a pushrod, to push the fuel through the discharge valve. The pump 100 is a reciprocating pump which uses the plunger 126 to change the volume within the pumping chamber 122 to create a pressure differential in a reciprocating motion, thereby causing fluid to be fed into and out of the pump 100 depending on the position of the plunger 126.

The pump 100 also includes a barrel clamp 104 which aligns the barrel 102 to the housing 108. The barrel clamp 104 has bolts 106 (e.g., two bolts, 106A and 106B, as illustrated) which hold the barrel 102 in place with respect to the housing 108. Furthermore, the barrel 102 has a cover 130 which can be placed over the barrel clamp 104 to define a metering chamber 120 above an inlet check valve 132 which passively checks or meters fuel coming from the groove 110 and the feed port 114 into the pumping chamber 122. In some examples, the pump 100 also includes a pressure relief valve and a discharge check valve (not shown) to control the pressure inside the metering chamber 120, as suitable.

In some examples, the barrel 102 has a circular, ovular, or polygonal cross section, and can be mounted to provide the outlet 118 that extends from the outer periphery of the barrel 102 in any direction not hindered by the position of the bolts 106. The bolts 106 have sufficient lengths to be able to couple with an opening in the housing 108 to hold the barrel clamp 104, the barrel 102, and the housing 108 at a fixed position with respect to each other. The additional auxiliary feed ports 116 may be routed within the housing 108 to meet other pump needs to any position within the groove 110 as needed. In some examples, the auxiliary feed ports 116 may be configured to deliver any type of fluid such as lubricant or air, among others.

Figure 3:
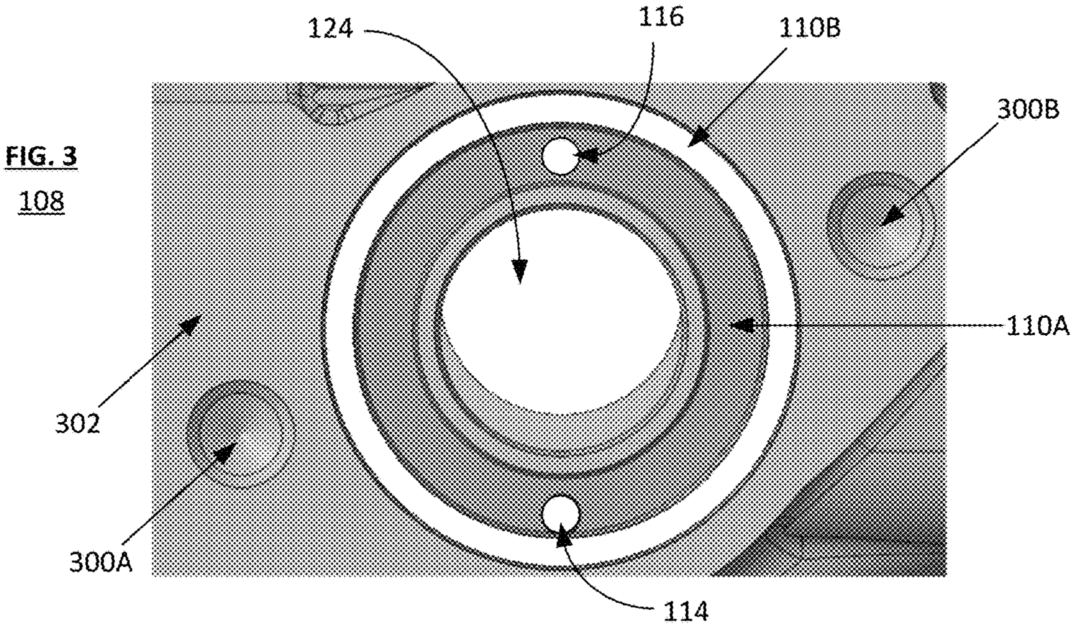
FIG. 3 is a top view of a housing that partially defines the groove to be formed by coupling to the barrel.

FIG. 3 shows a partial view of the housing 108 from the top down. Shown in the middle is the housing chamber 124 which is an opening surrounded by the groove 110. The groove 110, which has a depth with respect to a top surface 302 of the housing 108, is surrounded by one or more bore 300 for the one or more bolt 106. Shown in the figure are two bores 300A and 300B which are configured to receive the bolts 106A and 106B, respectively, from FIG. 1. In some examples, the bores 300A and 300B are aligned linearly on opposing sides of the housing chamber 124, but in other examples, the bores 300A and 300B may be positioned differently, as suitable for the configuration. In some examples, there may be more than two bores, such as three, four, or five bores, which may be implemented to further stabilize the barrel 102 with respect to the housing 108.

Figure 4:
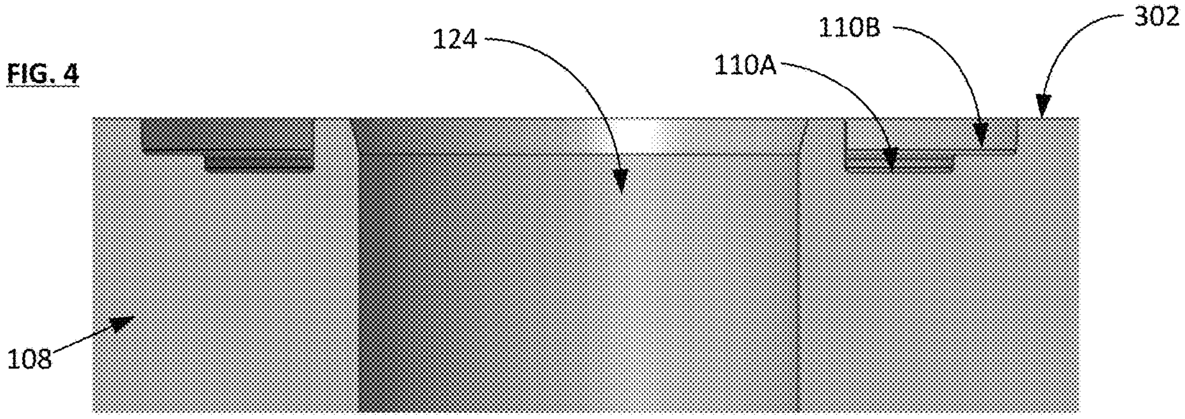
FIG. 4 is a cutaway side view of the housing of FIG. 3.

In some examples, the groove 110 has two sections: an inner groove 110A and an outer groove 110B. The inner and outer grooves may have different depths, as shown in FIG. 4 where the inner groove 110A is a deeper groove that reaches or extends farther down from the surface 302 of the housing 108 than the outer groove 110B. The groove 110 (which may be the inner groove 110A and/or outer groove 110B) defines the location of the feed port 114 and the one or more additional accessory port 116. The location of each of the feed ports 114 and 116 may vary among different types of housing 108. For example, there may be two or more accessory ports 116 located along the grove 110. The feed ports 114 and 116 may be dispersed equidistally with one another, i.e. there is equal spacing between each neighboring port, or some of the ports may be located closer to their neighbors than other ports. The location of these ports may be anywhere so long as the ports are entirely contained within the area defined by the groove and do not protrude from the groove 110. FIG. 4 is the cutaway sideview of the housing 108 showing the difference in depths of the inner groove 110A and the outer groove 110B, as well as the top surface 302. The combination of the surface 302 and the grooves 110A and 110B resemble a set of steps.

Figure 5:
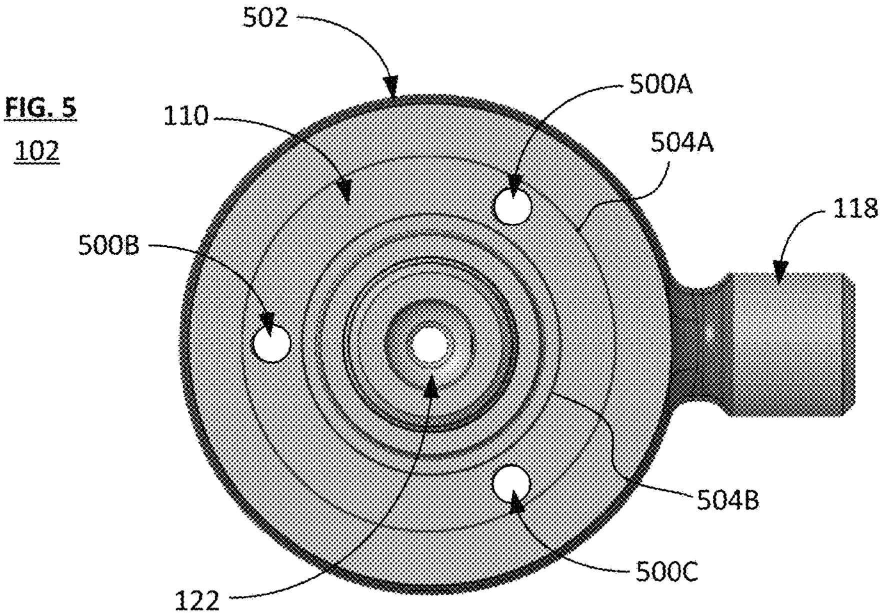
FIG. 5 is a bottom view of the flexible barrel as disclosed herein.

FIG. 5 shows a bottom surface 502 of the barrel 102 which comes into contact with the housing 108. The surface 502 has a plurality of receiving ports 500 (for example, three are shown in the figure: 500A, 500B, and 500C). The receiving ports 500 are all positioned within the region defined by the groove 110 of the housing 108, as shown in the figure with two circles, where an outer circle 504A and an inner circle 504B define the boundaries for the groove 110. The surface 502 of the barrel 102 may be flat or smooth (with the exception of where the receiving ports 500 are located) such that when the bottom surface 502 of the barrel 102 comes into contact with the top surface 302 of the housing 108, the contact portion creates an airtight seal surrounding the groove 110 so as to prevent any fluid from escaping in an undesired location. Thus, fluid communication is formed among the feed ports 114 and 116, the groove 110, and the receiving ports 500. Each of the receiving ports 500 leads to a fluid conduit or passage into the body of the barrel 102, the conduit or passage carrying the fluid throughout the housing 108 and pushed out of the barrel 102 by the plunger 126 from the outlet 118.

Although the examples in FIGS. 3 and 5 show the surface 302 of the housing 108 to have an indentation that defines the groove 110 and the surface 502 of the barrel 102 to be smooth, other configurations are also possible. For example, the surface 302 of the housing 108 may be smooth and the groove 110 may be defined by an indentation in the surface 502 of the barrel 102. In some examples, there may be an indentation in each of the surfaces 302 and 502 which altogether define the groove 110 when the two surfaces 302 and 502 contact each other. In this case, the indentations in the surfaces 302 and 502 at least partially, or entirely, align with each other to form the groove 110.

In a common rail fueling system, there may be multiple barrels 102 which couple with the housing 108, in which case each of the barrels 102 may have such indentation to form the groove 110, or the housing 108 has multiple indentations to form the grooves 110. Alternatively, the barrels 102 an the housing 108 may all have indentations to form the grooves altogether. In some cases, when both the barrel 102 and the housing 108 have the indentations, each indentation may be smaller (e.g., shallower) than when only the barrel 102 or the housing 108 has the indentation. In some cases, it may be preferable to keep the surface of either the barrel 102 or the housing 108 to be smooth for ease of manufacture and/or assembly, or simply due to the preference of the manufacturer.

Furthermore, the common rail fueling system may be formed by separately and individually preparing the barrels 102 and the housing 108 via any known manufacturing process, and then subsequently placed into contact with each other. In some examples, the surfaces 302 and 502 come into contact with each other to form the grooves 110. The surfaces 302 and 502 remain in contact by securing the barrels 102 and the housing 108 using the clamps 104 and bolts 106. The clamps 104 may be positioned on the barrels 102 after which the bolts 106 are drilled through the clamps 104, through the barrels 102, and then into the housing 108. The bolts 106 would have threads on their outer surfaces that prevent the bolts 106 from disengaging from the housing 108 after they are drilled into the housing 108. In some examples, before the bolts 106 are inserted or after the bolts 106 are removed, the barrels 102 may be rotated with respect to the housing 108 to adjust the position of the outlet 118, thereby allowing flexibility in the positioning of the outlet 118. It is to be understood that the rotational displacement of the barrels 102 can still result in the grooves 110 defining a fluid communication between the ports 114, 116, and 500.

It is to be understood that the locations of the receiving ports 500 do not need to align with those of the feed ports 114 and 116. In some examples, the locations of the receiving ports 500 as well as the feed ports 114, 116 are unaligned with respect to each other, e.g. there is little to no overlap between the receiving ports 500 and the feed ports 114, 116 when viewed from the top (see FIG. 1). The unalignment does not prevent the receiving ports 500 and the feed ports 114, 116 to be in fluid communication with one another because the sealed groove 110 is capable of letting fluid flow from the feed ports 114 and 116 into the receiving ports 500 through the groove 110, thereby reducing the need to align the positions of the inlet and outlet openings when assembling the fuel injection system. The barrel 102 is rotatable with respect to the housing 108 such that the locations of the feed ports 114, 116 and the receiving ports 500 may change when the barrel 102 is rotated to change the position of the high-pressure outlet 118. The rotation of the barrel 102 does not affect the fluid communication between the ports 114, 116, and 500; the fluid communication therebetween is maintained via the groove 110. The barrel 102 as shown has a circular configuration to allow such rotation and to also receive the rotatable barrel clamp 104 which holds the barrel 102 in position.

The high-pressure fuel pump 100 can be formed by preparing the housing 108 having the fluid feed ports 114 and 116 and the barrels 102 each including the fluid receiving ports 500. Surfaces of the barrels 102 are contacted with the surface 302 of the housing 108 to form grooves 110 therebetween, in any position. The grooves 110 provide fluid communication between feed ports 114 and/or 116 and the receiving ports 500 in each position. The barrels 102 are secured to the housing 108 with clamps 104. Securing the barrels 102 may involve drilling the bolts 108 through the clamps 104 and the barrels 102 such that an end of the bolt 108 positioned in the housing 108. In some examples, the barrels 102 are rotated with respect to the housing 108 while maintain the fluid communication in the grooves 110 between the feed ports 114 and/or 116 and the receiving ports 500.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A high-pressure fuel pump comprising: a housing including at least one fluid feed port and an opening, the housing including a groove around the opening, the groove having an outer groove and a deeper inner groove, and the fluid feed port is located along the inner groove; a barrel including at least one fluid receiving port, the barrel having a first surface configured to rotatably contact a second surface of the housing, the first surface of the barrel making direct planar contact with the second surface of the housing around the groove with the barrel inserted into the opening, the groove providing fluid communication between the at least one fluid feed port of the housing and the at least one fluid receiving port of the barrel; and a clamp configured to secure the barrel to the housing.

2. The high-pressure fuel pump of claim 1, the barrel being configured to be secured to the housing in any of a plurality of positions and the groove providing fluid communication between the at least one fluid feed port and the at least one fluid receiving port in each of the plurality of positions.

3. The high-pressure fuel pump of claim 2, further comprising an outlet from which fluid in the fuel pump exits, wherein a position of the outlet is adjustable with respect to the housing.

4. The high-pressure fuel pump of claim 1, the first surface of the barrel being a smooth surface and the second surface of the housing having an indentation which defines the groove.

5. The high-pressure fuel pump of claim 1, the first surface of the barrel and the second surface of the housing each having an indentation which together define the groove.

6. The high-pressure fuel pump of claim 1, the inner groove extending farther away from the second surface of the housing than the outer groove.

7. The high-pressure fuel pump of claim 1, the groove having a circular configuration.

8. The high-pressure fuel pump of claim 1, the groove providing fluid communication between the at least one fluid feed port and the at least one fluid receiving port when the at least one fluid feed port and the at least one fluid receiving port are unaligned with respect to each other.

9. A common rail fuel injection system comprising:

a housing including a plurality of fluid feed ports configured to deliver fuel and a plurality of openings, the housing including a groove around each of the plurality of openings, each of the grooves having an outer groove and a deeper inner groove, and each of the plurality fluid feed ports is located along the inner groove of a respective one of the grooves;

a plurality of barrels, each including a fluid receiving port, the plurality of barrels each having a first surface configured to contact a second surface of the housing, the first surface of each of the plurality of barrels making direct planar contact with the second surface of the housing around respective ones of the grooves with the plurality of barrels inserted into corresponding ones of the plurality of openings, each of the plurality of grooves providing fluid communication between at least one of the fluid feed ports of the housing and at least one of the fluid receiving ports of the barrels in each of the positions; and a plurality of clamps configured to secure the barrels to the housing.

10. The common rail fuel injection system of claim 9, each of the first surfaces being a smooth surface and the second surface of the housing having a plurality of indentations which define the plurality of grooves.

11. The common rail fuel injection system of claim 9, the first surface of the barrel and the second surface of the housing each having an indentation which together define the groove.

12. A method of assembling a high-pressure fuel injection system comprising:

preparing a housing which includes a plurality of fluid feed ports configured to deliver fuel and a plurality of openings, the housing including a groove around each of the plurality of openings, each of the grooves having an outer groove and a deeper inner groove, and each of the plurality fluid feed ports is located along the inner groove of a respective one of the grooves;

preparing a plurality of barrels, each including a plurality of fluid receiving ports;

inserting the plurality of barrels in respective ones of the plurality of openings;

contacting first surfaces of the barrels with a second surface of the housing around respective ones of the grooves in any of a plurality of positions, the first surfaces of the barrels make direct planar contact with the second surface of the housing around respective ones of the grooves with the plurality of barrels inserted into corresponding ones of the plurality of openings, each of the grooves providing fluid communication between at least one of the fluid feed ports of the housing and at least one of the fluid receiving ports of the barrels in each of the positions; and securing the barrels to the housing using a plurality of clamps.

13. The method of claim 12, wherein securing the barrels includes, for each of the barrel, drilling at least one bolt through the clamp and the barrel such that an end of the at least one bolt is positioned in the housing.

14. The method of claim 12, further comprising rotating at least one of the barrels with respect to the housing while maintaining the fluid communication between the at least one of the fluid feed ports and the at least one of the fluid receiving ports.

* * * * *